(No Model.)

E. JACKSON.
COTTON CHOPPER.

No. 443,049. Patented Dec. 16, 1890.

Witnesses:
E. A. Ellis,
B. Bracken,

Inventor:
E. Jackson,
per Lehmann & Pattison
atty

UNITED STATES PATENT OFFICE.

ELIAS JACKSON, OF MASTODON, MISSISSIPPI.

COTTON-CHOPPER.

SPECIFICATION forming part of Letters Patent No. 443,049, dated December 16, 1890.

Application filed June 26, 1890. Serial No. 356,881. (No model.)

*To all whom it may concern:*

Be it known that I, ELIAS JACKSON, of Mastodon, in the county of Panola and State of Mississippi, have invented certain new and useful Improvements in Cotton-Choppers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-choppers; and it consists in the combination and arrangement of parts, which will be more fully described hereinafter.

The object of my invention is to provide a machine for chopping or thinning cotton, and which as it is drawn along the rows will thin the cotton, leaving the plants any desired distance apart, no matter what the distance between the rows may be.

Figure 1:
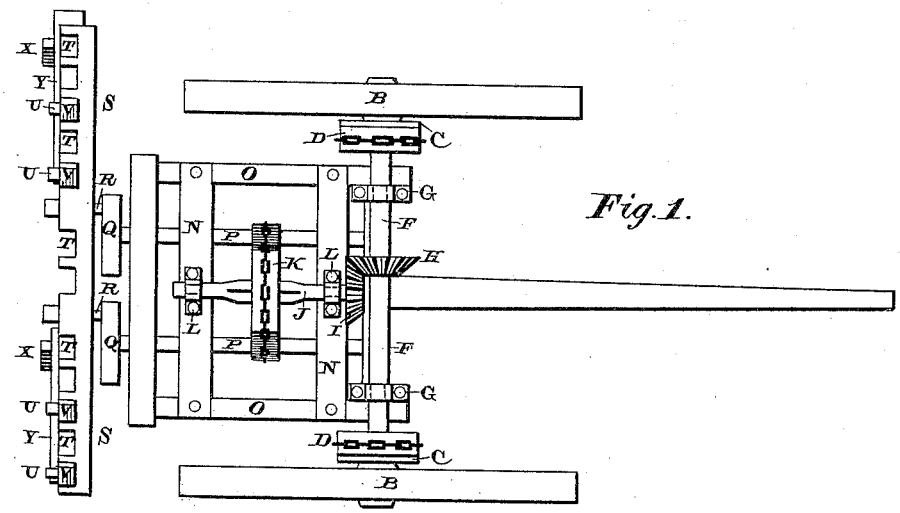
Figure 2:
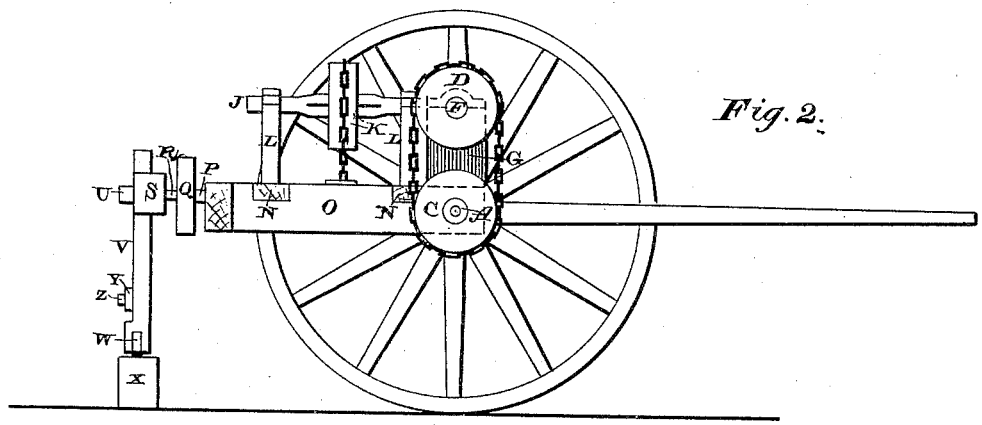
Figure 3:
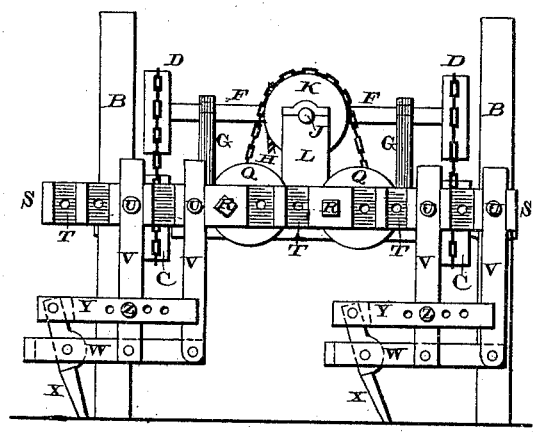

Figure 1 is a plan view of the machine which embodies my invention. Fig. 2 is a side elevation. Fig. 3 is a rear view.

A represents the axle, which is supported by the driving-wheels B, which may be of any diameter desired. Upon the inner ends of the hubs of these wheels B are formed pulleys or sprocket-wheels C, from which extend bands or chains up over the pulleys D upon the opposite ends of the shaft F. This shaft F is journaled in the standards G, which rise from the axle, and secured to this shaft is a beveled wheel H, which meshes with a corresponding wheel I upon the shaft J. This shaft is journaled in the standards L, which rise from the cross-pieces N, which extend across the top of the frame O and extend backward from the axle A. Secured to this shaft J is a driving-pulley K, from which extends a driving belt or chain around the two shafts P. The frame O is of any desired shape or size and forms bearings for the chopper-shafts P, and secured to the rear ends of these shafts P are the wrist-wheels Q, which operate the chopping mechanism. Placed upon the wrist-pins R is the cross-bar S, which has a number of vertical grooves or recesses T in its rear side and a perforation for each recess. Pivoted by means of suitable pins U in the recesses T are the hangers or supports V, which are connected in pairs at their lower ends by means of the cross-bars W, which have the hoes X pivoted to their ends. The heads of the hoes X project through suitable slots in the cross-bars W and extend any suitable distance above their upper edges, and to the upper ends of these heads are pivoted the regulating-rods Y. Through each one of the rods Y where it extends past the hangers or supports V is formed a number of perforations, and through these perforations the pins Z are passed.

By means of the vertical recesses T in the bar S the hangers V can be adjusted any desired distance apart at their upper ends, and they can be moved laterally toward either end of the bar, so as to regulate not only the positions of the hoes, but their distances apart. As the hangers V are provided with series of perforations, they can be adjusted vertically by means of the pins U, and thus regulate the depth to which the hoes X shall cut. In order to regulate the angle at which the hoes X shall stand, the bars Y are adjusted horizontally endwise, and thus the hoes X are made to turn upon their pivots and stand at any desired angle.

By regulating the proportions of the wheels and pulleys any desired speed can be given to the chopper-shafts and their wrist-wheels Q as the machine is drawn along, and thus the hoes can be made to chop nearer together or farther apart, as may be desired. Either a quick or a slow motion may be given to the hoes by changing the proportions of the wheels, and thus leave any desired number of plants in a stand.

Having thus described my invention, I claim—

1. In a cotton-chopper, the combination of the chopper-shafts provided with wrist-wheels and their operating mechanism with the adjustable hangers V, the cross-bars attached to the lower ends of the hangers, and the hoes connected to the ends of the cross-bars, substantially as shown.

2. The cross-bar S, provided with a number of vertical recesses, combined with the adjustable hangers V, the cross-bars W, connecting the lower ends of the hangers together, the hoes X, pivoted to the cross-bars, and the endwise-adjustable rods Y, which regulate the angle at which the hoes stand, substantially as described.

3. The combination of the axle, the driving-wheels provided with pulleys, the driving chains or belts, the shaft F, journaled in suitable bearings and provided with the pulleys D and bevel-wheel H, the wheel I, the pulley K, secured to the shaft J, the chopper-shafts P, journaled upon the frame O and provided with the wrist-wheels Q, the recessed shaft S, and suitable devices for operating the hoes, substantially as set forth.

In testimony whereof I affix my signature in presence of two witnesses.

ELIAS JACKSON.

Witnesses:
PHILLIPS HARRIS,
ROBERT X ANDERSON.
       his
       mark